US012570036B2

(12) United States Patent
Hengl et al.

(10) Patent No.: US 12,570,036 B2
(45) Date of Patent: Mar. 10, 2026

(54) METHOD AND APPARATUS FOR FORMING PLASTIC PREFORMS INTO PLASTIC CONTAINERS WITH INTERMEDIATE BLOWING PRESSURE CONTROL

(71) Applicant: KRONES AG, Neutraubling (DE)

(72) Inventors: Benedikt Hengl, Essing (DE); Daniel Vogler, Neutraubling (DE); Dominik Meier, Parsberg (DE); Markus Kulzer, Zell (DE)

(73) Assignee: KRONES AG, Neutraubling (DE)

( * ) Notice: Subject to any disclaimer, the term of this patent is extended or adjusted under 35 U.S.C. 154(b) by 75 days.

(21) Appl. No.: 18/243,986

(22) Filed: Sep. 8, 2023

(65) Prior Publication Data

US 2024/0083096 A1      Mar. 14, 2024

(30) Foreign Application Priority Data

Sep. 8, 2022      (DE) ..................... 10 2022 122 883.5

(51) Int. Cl.
B29C 49/78        (2006.01)
B29C 49/00        (2006.01)
              (Continued)

(52) U.S. Cl.
CPC ........ B29C 49/783 (2013.01); B29C 49/0031 (2013.01); B29C 49/0062 (2022.05);
              (Continued)

(58) Field of Classification Search
CPC ........ B29C 49/42815; B29C 49/42095; B29C 49/783; B29C 49/42845; B29C 49/0031;
              (Continued)

(56) References Cited

U.S. PATENT DOCUMENTS 9,339,969 B2      5/2016  Asbrand et al.
2004/0173949 A1   9/2004  Storione et al. .............. 264/529
              (Continued)

FOREIGN PATENT DOCUMENTS

CN        104228042      12/2014  ............. B29C 49/28
DE        102004014653   10/2005  ............. B29C 49/16
              (Continued)

OTHER PUBLICATIONS

U.S. Appl. No. 18/243,979, filed Sep. 8, 2023, Hengl et al.
              (Continued)

*Primary Examiner* — Monica A Huson
(74) *Attorney, Agent, or Firm* — HAYES SOLOWAY P.C.

(57)        ABSTRACT

A method for forming plastic preforms into containers, wherein a transport device transports the preforms along a transport path. The transport device has a rotatable transport carrier where forming stations are arranged for forming the preforms into containers. The forming stations each have devices which apply a flowable medium to the preforms, and the apparatus has three pressure reservoirs which store the flowable and gaseous medium to expand the preforms. The preforms are applied to a first operating mode with a first pressure level stored in the first pressure reservoir, and at least one second and one third pressure levels stored in the second and third pressure reservoirs. The second pressure level is higher than the first, and the third pressure level is higher than the second. The apparatus is operated in a second operating mode, which differs from the first mode by pressure level prevailing in the second pressure reservoir.

8 Claims, 3 Drawing Sheets

(51) Int. Cl.
    *B29C 49/28*        (2006.01)
    *B29C 49/42*        (2006.01)

(52) U.S. Cl.
    CPC ........ *B29C 49/28* (2013.01); *B29C 49/42095*
        (2022.05); *B29C 49/42815* (2022.05); *B29C*
        *49/42378* (2022.05); *B29C 2049/7833*
        (2022.05); *B29C 2049/7882* (2022.05); *B29C*
        *2791/007* (2013.01)

(58) Field of Classification Search
    CPC ..... B29C 49/0062; B29C 49/28; B29C 49/06;
        B29C 2049/7832; B29C 49/12; B29C
        2049/7882; B29C 2949/0715; B29C
        49/42378; B29C 2049/7833; B29C
        2791/007; B29L 2031/7158; B29K
        2067/003
    See application file for complete search history.

(56) References Cited

U.S. PATENT DOCUMENTS

| | | | |
|---|---|---|---|
| 2008/0164642 A1 | 7/2008 | Hirdina ......................... | 264/528 |
| 2008/0191394 A1 | 8/2008 | Elliott | |
| 2009/0108505 A1 | 4/2009 | Steiner ......................... | 264/535 |
| 2010/0090375 A1 | 4/2010 | Geltinger et al. | |
| 2010/0171243 A1 | 7/2010 | Zoppas et al. ................ | 264/529 |
| 2011/0057343 A1 | 3/2011 | Brunner et al. ............. | 264/40.1 |
| 2011/0175246 A1 | 7/2011 | Winzinger ................... | 264/40.1 |
| 2011/0260350 A1 | 10/2011 | Haesendonckx et al. ... | 264/40.1 |
| 2012/0227825 A1 | 9/2012 | Voth et al. ...................... | 137/14 |
| 2014/0110873 A1 | 4/2014 | Asbrand et al. ...... | B29C 49/783 |
| 2016/0136868 A1 | 5/2016 | Haller .................... | B29C 49/78 |
| 2016/0151957 A1 | 6/2016 | Wolfe et al. | |
| 2016/0176099 A1 | 6/2016 | Knapp | |
| 2019/0315039 A1 | 10/2019 | Huettner et al. ........ | B29C 49/06 |
| 2023/0100387 A1 | 3/2023 | Brunner et al. | |
| 2024/0083090 A1 | 3/2024 | Hengl et al. | |
| 2024/0083098 A1 | 3/2024 | Meier et al. | |
| 2024/0408808 A1 | 12/2024 | Kulzer et al. | |

FOREIGN PATENT DOCUMENTS

| | | | |
|---|---|---|---|
| DE | 102008034934 | 4/2009 | ............ B29C 49/78 |
| DE | 102009041013 | 3/2011 | ............ B29C 49/18 |
| DE | 102011110962 | 2/2013 | ............ B29C 49/42 |
| DE | 102012110023 | 4/2014 | ............ B29C 49/18 |
| DE | 102014116891 | 5/2016 | ............ B29C 49/78 |
| EP | 1175990 | 1/2002 | ............ B29C 49/78 |
| EP | 1974892 | 10/2008 | ............ B29C 49/78 |
| EP | 2345524 | 7/2011 | ............ B29C 49/78 |
| EP | 2441562 | 4/2012 | ............ B29C 49/42 |
| EP | 2497619 | 9/2012 | ............ B29C 49/42 |
| EP | 2352633 | 12/2012 | ............ B29C 49/78 |
| EP | 2722153 | 4/2014 | ............ B29C 49/78 |
| GB | 2431372 | 4/2007 | ............ B29C 49/18 |
| WO | 2007077241 | 7/2007 | ............ B29C 49/78 |
| WO | 2013023789 | 2/2013 | ............ B29C 49/16 |

OTHER PUBLICATIONS

U.S. Appl. No. 18/243,995, filed Sep. 8, 2023, Vogler et al.
U.S. Appl. No. 18/244,037, filed Sep. 8, 2023, Hengl et al.
U.S. Appl. No. 18/244,102, filed Sep. 8, 2023, Meier et al.
Search Report issued in German Patent Appln. Serial No. 10 2022 122 885.1, dated Apr. 12, 2023, with machine English translation, 12 pages.
Search Report issued in German Patent Appln. Serial No. 10 2022 122 880.0, dated Apr. 28, 2023, with machine English translation, 7 pages.
Search Report issued in German Patent Appln. Serial No. 10 2022 122 879.7, dated Mar. 14, 2023, with machine English translation, 11 pages.
Search Report issued in German Patent Appln. Serial No. 10 2022 122 883.5, dated Mar. 14, 2023, with machine English translation, 9 pages.
Search Report issued in German Patent Appln. Serial No. 10 2022 122 878.9, dated Apr. 13, 2023, with machine English translation, 10 pages.
Extended Search Report issued in EPO Patent Appln. Serial No. 23193133.8-1014, dated Feb. 5, 2024, with machine English translation, 8 pages.
Extended Search Report issued in EPO Patent Appln. Serial No. 23193217.9-1014, dated Feb. 22, 2024, with machine English translation, 19 pages.
Extended Search Report issued in EPO Patent Appln. Serial No. 23193185.8-1014, dated Feb. 5, 2024, with machine English translation, 8 pages.
Extended Search Report issued in EPO Patent Appln. Serial No. 23194549.4-1014, dated Feb. 7, 2024, with machine English translation, 9 pages.
Extended Search Report issued in EPO Patent Appln. Serial No. 23194845.6-1014, dated Feb. 9, 2024, with machine English translation, 8 pages.

Fig. 2

METHOD AND APPARATUS FOR FORMING PLASTIC PREFORMS INTO PLASTIC CONTAINERS WITH INTERMEDIATE BLOWING PRESSURE CONTROL

BACKGROUND OF THE INVENTION

The present invention relates to a method and an apparatus for forming plastic preforms into plastic containers. Such methods and apparatuses have long been known from the prior art. In this process, heated plastic preforms are formed into plastic containers and, in particular, plastic bottles by being applied with a flowable medium, and in particular with compressed air.

These forming processes have become more elaborate over time, since not only are satisfactory containers to be produced, but compressed air and therefore energy are also to be saved as much as possible.

It is known in the prior art that plastic preforms are applied several pressure stages or pressure levels in order to expand them. It is accordingly known that, initially, a pre-blowing pressure is used, then, an intermediate blowing pressure stage, and, finally a final blowing pressure to completely form and stabilize the container.

In the prior art, an intermediate blowing stage is provided, and the operator specifies a target pressure which is to be used for this blowing stage. A corresponding pressure reservoir such as a ring channel is always suspended in a higher-level supply assembly, which can supply fresh air via a dome pressure reducer and a proportional valve, and which can also have a relief unit that can relieve air from the pressure reservoir into the atmosphere.

One problem in this case is that the machine operator does not know the perfect setpoint with regard to energy. In practice, the ideal pressure is usually only approximately determined by rule of thumb. In addition, it is necessary in the prior art to prefill all pressure reservoirs and also those for the intermediate pressure stage. It has also been shown that the air recovery control for additional intermediate blowing stages is no longer practicable. Ideal pressures for the intermediate pressure can only be determined using complex calculations.

The object of the present invention is therefore to make such apparatuses and methods more efficient on the one hand, and more economical on the other.

SUMMARY OF THE INVENTION

In a method according to the invention for forming plastic preforms into plastic containers, a transport device transports the plastic preforms along a predetermined transport path, wherein the transport device has a rotatable transport carrier on which a plurality of forming stations for forming the plastic preforms into the plastic containers are arranged, and wherein the forming stations each have application devices which apply the plastic preforms with the flowable medium, and wherein the apparatus has at least three pressure reservoirs and in particular compressed air reservoirs which store the flowable and in particular gaseous media and, to expand them, the plastic preforms are applied in a first operating mode with a first pressure level stored in the first pressure reservoir, at least one second pressure level stored in the second pressure reservoir, and a third pressure level stored in the third pressure reservoir, wherein the second pressure level is higher than the first pressure level, and the third pressure level is higher than the second pressure level.

Particularly preferably, the apparatus is operated at least temporarily in a second operating mode, wherein this second operating mode differs from the first operating mode by a pressure level prevailing in the second pressure reservoir. It is therefore proposed that two different operating modes be available, or at least two operating modes which differ in particular in terms of the configuration of the second pressure level, which is preferably an intermediate blowing pressure.

Particularly preferably, the first pressure level is a pre-blowing pressure, hereafter also referred to as P1, with which the containers are pre-blown at the beginning of expansion. The second pressure level is particularly preferably a (first) intermediate blowing pressure, hereafter also referred to as Pi1, and the third pressure level is particularly preferably a final blowing pressure (hereafter also referred to as P2) with which the container is completely formed and is preferably also held in a formed position for a time. Preferably, the containers are accordingly applied with a first pressure (pre-blowing pressure), a third pressure (final blowing pressure), and at least one second pressure (intermediate blowing pressure), or a first pressure (pre-blowing pressure), a third pressure (final blowing pressure), and at least one second pressure (intermediate blowing pressure) are present. Therefore, n-intermediate blowing pressures (Pi1, Pi2, PiN) would be conceivable, so that the container is preferably applied with several intermediate blowing pressures, or intermediate blowing occurs in several stages.

In a further preferred method, the plastic preforms are also stretched by means of a stretching unit. For this purpose, a stretching rod is preferably inserted into the plastic preforms in order to expand them in their longitudinal direction.

In a further preferred method, the second operating mode is a starting operation of the apparatus, or a start-up operation in which it is put into operation. Preferably, at least at the beginning of this second operating mode, i.e., the starting operation, only the first pressure reservoir and the third pressure reservoir are filled with compressed air, and/or only the first and the third pressure reservoirs are filled with the fresh air. Fresh air is understood to mean air coming from the outside which is supplied, for example, by a compressor or by a rotary distributor. The second pressure reservoir is preferably without pressure at the beginning, or is substantially at the external pressure.

Particularly preferably, fresh air or air from outside is not supplied to the second pressure reservoir in either mode of operation and overall.

Particularly preferably, in the second operating mode, the plastic preforms are at least temporarily applied only with the first pressure level and the second pressure level. This means that, at the beginning of a process, only the first pressure level, i.e., the pre-blowing pressure, and the third pressure level, i.e., the final blowing pressure P2, are applied to the container, or the plastic preform is applied with these pressure levels.

During this initial time, no compressed air is available in the intermediate blowing pressure reservoir, so that intermediate blowing cannot therefore also occur.

Particularly preferably, in at least one operating mode and preferably the two operating modes, compressed air is guided at least temporarily from the forming stations and/or the plastic containers back into the second pressure reservoir. If there are two or more intermediate blowing stages, compressed air is preferably recycled into each pressure reservoir for the intermediate blowing pressure, or each intermediate blowing stage is supplied with recycled compressed air.

In this preferred method, a recycling process is accordingly described in which blowing air is conducted back from the containers into individual pressure reservoirs—here, into the second pressure reservoir. In this way, during the start-up phase, the second pressure reservoir can be filled with compressed air, which, however, originates (in particular, exclusively) from the containers to be treated or expanded.

Such a recycling of blowing air during the expansion or the returning of blowing air from the containers is known per se from the prior art. For this purpose, the invention proposes to also use this recycling also to a certain extent for the initial filling of the second pressure reservoir.

Accordingly, in effect, it is proposed that the second pressure reservoir be filled by recycling or with the aid of compressed air recycling.

In a further preferred method, a pressure level in the second pressure reservoir is determined, and, depending upon this pressure level, there is a transition during operation from one operating mode into another operating mode. For example, it can accordingly be determined that the pressure behavior in the second pressure reservoir has reached a target level on the one hand, and is also stable on the other hand. In this case, there can be a transition where the containers are expanded not only in advance, but also in-between, or the second pressure reservoir can also be actively integrated into the expansion of the containers.

A (temporal) first phase is accordingly proposed (which, however, corresponds to the aforementioned second operating mode) in which the first containers are blown without the intermediate blowing pressure. In this phase, the pre-blowing pressure P1 is therefore directly followed by application of the final blowing pressure P2. On the other hand, however, in this phase, recycling into the at least one intermediate blowing pressure level (Pi1) already occurs. Since, in this phase, the pressure is only returned, but not decreased, the pressure in the relevant pressure reservoir or annular channel increases from container to container. If a specific level in the pressure levels is exceeded, the machine changes to "phase 2."

In phase 2, a pressure build-up occurs with, meanwhile, the at least one intermediate blowing pressure level and preferably with two intermediate blowing pressure levels.

As soon as the pressure level in the one pressure reservoir and preferably in two intermediate pressure reservoirs is stable, the apparatus can transition into the second operating mode (normal working mode).

In a further preferred method, the plastic preforms are applied with a further pressure level, wherein this further pressure level is higher than the second pressure level, but lower than the third pressure level. In this method, it is proposed that the plastic preforms are applied with two intermediate blowing pressure levels. Preferably, recycled compressed air is also supplied into the pressure reservoir of the further pressure level.

Preferably, a further pressure reservoir and in particular an annular channel are available for this further pressure level. This further pressure reservoir is preferably also not filled at the beginning of a forming process, and/or this further pressure reservoir is not filled with fresh air and/or with air from the outside.

In a further preferred method, working parameters for application with the first and/or third pressure level are predefined, and in particular predetermined by a user. For example, a user can accordingly specify which pressure level the first and third pressure levels are to be at, when corresponding valves are to open and close, for application to the plastic preforms.

In a further preferred method, working parameters for the application of the second pressure level are determined by a control device. In this way, it is also possible for a beginning of pressure or an ending of pressure or a pressure duration to be predefined. The controller therefore particularly preferably determines ideal pressure levels and pressure times for the intermediate blowing pressure stages.

Particularly preferably, a target pressure is therefore not predefined for the intermediate blowing pressure stages Pi1 and Pi2. Instead, the apparatus itself preferably finds an optimum for these pressures (and/or application times).

The preferred boundary conditions for this are constant air removal and air recovery times. In the first development step, these can preferably be assumed to be fixed. In further embodiments, regulated pressure rise and recycling times would also be conceivable.

An advantage of this embodiment is that pressure reducers and prop valves for the respective pressure reservoirs Pi1 and Pi2 are omitted.

In a preferred embodiment, however, a single valve can be available for service or diagnostic purposes or for prefilling the channel.

In the following, a starting operation for such an apparatus, divided into several phases, is described:

In a first phase (phase 1), the first bottles are blown without Pi, i.e., without the intermediate blowing pressures. This means that P1 is immediately followed by P2. However, Pi2 and Pi1 are recycled on the recovery side. Since there is only recycling, but no removal, the pressure in the annular channel increases from bottle to bottle. If a specific level in the annular channels is exceeded, the machine changes into the second phase, i.e., into "phase 2."

The second phase ("phase 2") is initiated when certain starting conditions are met, e.g., the intermediate blowing pressure Pi1 is greater than ⅓ of the final blowing pressure P2, and the intermediate blowing pressure Pi2 is greater than ⅔ of the final blowing pressure P2.

As soon as the annular channel pressures reach or exceed the starting condition, the controller changes to phase 2. Here, for the first time, Pi1 and Pi2 are switched on during pressure build-up, in addition to P1 and P2. As before, Pi2 and Pi1 are still switched on the recovery side. As a result of the fixed pressure build-up and recycling times, a certain Pi1 and Pi2 pressure evens out. This second phase is preferably a transition phase between the above-described, second operating mode and the first operating mode.

Preferably, therefore, the apparatus is operated in at least three different operating modes, wherein the third operating mode is preferably a transition mode between the second operating mode and the first operating mode, and/or the third operating mode is temporally between the second operating mode and the first operating mode.

The second phase is preferably followed by a third phase ("phase 3").

For this third phase as well, a start condition is preferably defined; for example, it can consist of the intermediate blowing pressures Pi1 and Pi2 being stable, and the intermediate blowing pressure Pi1 being greater than the pre-blowing pressure P1. In addition, the above conditions can also apply here for the start of phase 2.

The machine transitions into phase 3 when the annular channel pressures for Pi1 and Pi2 have stabilized. However, the basic requirement is that Pi1 still be above P1. If all conditions are met, the P1 recycling is now also used in phase 3. The regulation of P1 recycling occurs as known per se in the prior art. With phase 3, the machine is in full operation and/or the aforementioned first operating mode.

Preferably, the entire sequence of phase 1-3 is generally carried out in only a few seconds. The stable steady state is therefore reached relatively quickly.

If a starting condition is no longer fulfilled, the system preferably changes automatically back to the previous phase. This switching can occur at any time in real time and preferably represents a response to a specific machine situation. This method makes it possible to intercept interferences such as leakages, bursting bottles, rejection of pre-blown bottles, or switched-off stations.

The invention now also makes it possible to use Pi pressures, i.e., intermediate blowing pressures, which are lower than P1. The relief pressure is accordingly detached from the P1 pressure, although it is naturally still advantageous for the air consumption to feed P1 completely via recycling.

In addition, the method according to the invention offers an effective method for handling interferences.

Furthermore, perfect annular channel pressures (in particular, for intermediate blowing) can be provided for each blowing process—in particular, for blowing processes with two or more intermediate blowing stages.

The present invention is further directed to an apparatus for forming plastic preforms into plastic containers with a transport device which transports the plastic preforms along a predetermined transport path P, wherein the transport device has a rotatable transport carrier on which a plurality of forming stations for forming the plastic preforms into the plastic containers is arranged. In this case, the forming stations each have application devices (in particular, blowing nozzles) which apply the plastic preforms with the flowable medium, and the apparatus has at least three reservoirs or pressure reservoirs which store the flowable and in particular gaseous medium.

Furthermore, in a first operating mode, to expand them, the plastic preforms can be applied with a first pressure level stored in the first pressure reservoir, at least one second pressure level stored in the second pressure reservoir, and a third pressure level stored in the third pressure reservoir, wherein the second pressure level is higher than the first pressure level, and the third pressure level is higher than the second pressure level.

According to the invention, the apparatus can be operated temporarily in a second operating mode, wherein this second operating mode differs from the first operating mode by a pressure level prevailing in the second pressure reservoir. In a further embodiment according to the invention, the apparatus has a fresh air supply device which is designed such that it applies the first and third pressure reservoirs, but not the second pressure reservoir, with fresh air.

Particularly preferably, the fresh air supply device has a compressor or a pressure connection. Furthermore, the apparatus preferably has a distributor device which guides the compressed air starting from the fresh air supply device to the rotatable carrier, and in particular to the pressure reservoirs. The distributing device is preferably designed as a rotary distributor.

In a further preferred embodiment, the pressure reservoirs are annular channels. Particularly preferably, these pressure reservoirs are arranged on the rotatable carrier.

In a further advantageous embodiment, the apparatus has a plurality of sensor and/or measuring devices for determining operating parameters. Particularly preferably, at least one pressure-measuring device is assigned to each pressure reservoir. Particularly preferably, one or more flow-measuring devices are also provided which determine a flow rate of air which passes from a pressure reservoir to the respective forming stations.

In a further advantageous embodiment, the apparatus comprises a regulating device for setting a pressure in the pressure reservoirs. This is in particular provided for the first and third pressure reservoirs. Particularly preferably, the regulating device is a dome pressure regulator.

In a further advantageous embodiment, the apparatus has a further pressure reservoir which is suitable and intended for applying the plastic preforms with a further pressure level. In particular, this is another intermediate blowing pressure level. Particularly preferably, this further pressure reservoir is also not applied with fresh air.

Particularly preferably, compressed air from the plastic containers can be guided or returned into at least one pressure reservoir. Particularly preferably, this is at least the second pressure reservoir for an intermediate blowing pressure, and/or the further pressure reservoir for the further intermediate blowing pressure, and/or the pressure reservoir for the aforementioned first pressure.

BRIEF DESCRIPTION OF THE DRAWINGS

Further advantages are found in the accompanying drawings. In the drawings:

FIG. 2 shows a representation of pressure characteristics in the different phases.

DETAILED DESCRIPTION OF THE INVENTION

Figure 1:
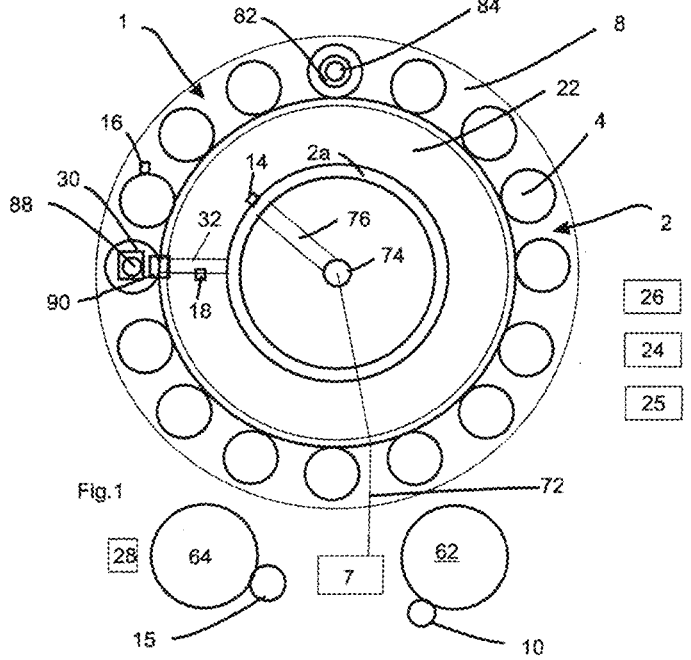
FIG. 1 shows a schematic representation of an apparatus according to the invention.

FIG. 1 shows an apparatus 1 for forming plastic preforms 10 into plastic containers 15. This apparatus has a rotatable carrier 22 on which a plurality of forming stations 4 are arranged. These individual forming stations each have blow-molding devices 82, which in their interior form a cavity for expanding the plastic preforms.

Reference sign 84 denotes an application device, which is used to expand the plastic preforms 10. This can be a blow nozzle, for example, which can be applied to a mouth of the plastic preforms in order to expand them. In addition, it is also conceivable to seal the blowing nozzle on the blow-molding device. Preferably, this application device is movable in a longitudinal direction, and preferably exclusively in a longitudinal direction of the plastic preforms.

Reference sign 90 denotes a valve arrangement, such as a valve block, which preferably has a plurality of valves that control the application of different pressure levels to the plastic preforms. Each forming station preferably has such a valve block.

In a preferred method, first, a pre-blowing pressure P1, then, at least one intermediate blowing pressure Pi that is higher than the pre-blowing pressure, and, finally, a final blow-molding pressure P2 that is higher than the intermediate blowing pressure Pi1 are applied to the plastic preforms. Particularly preferably, the plastic preforms are applied with a further intermediate blowing pressure Pi2 which is greater than the pressure Pi1, but smaller than the pressure P2.

After expansion of the plastic containers, the pressures or compressed air are preferably returned from the container to the individual pressure reservoirs.

Reference sign 88 denotes a stretching rod used to stretch the plastic preforms in their longitudinal direction. Preferably, all forming stations have such blow molds 82 and stretching rods 88. This stretching rod is preferably a component of a stretching device denoted by 30. The stretching rod is (preferably, also exclusively) movable in the longitudinal direction of the plastic preforms 10.

Preferably, the number of such forming stations 4 is between 2 and 100, preferably between 4 and 60, more preferably between 6 and 40.

The plastic preforms 10 are fed to the apparatus via a first transport device 62, such as, in particular but not exclusively, a transport starwheel. The plastic containers 15 are transported away via a second transport device 64.

Reference sign 7 denotes a pressure supply device, such as a compressor or also a compressed-air connection. The compressed air is supplied via a connecting line 72 to a rotary distributor 74 and from there passed on via a further line 76 to the compressed air reservoir 2a, which in this case is an annular channel. Thus, preferably, such rotary distributor serves for supplying air from a stationary part of the apparatus into a rotating part of the apparatus.

In addition to this annular channel 2a shown, further annular channels are preferably provided, which are, however, concealed by the annular channel 2a in the illustration shown in FIG. 1, for example lie underneath. Accordingly, one pressure reservoir each is available for storing the pressure P2, and the intermediate blowing pressures Pi1 and Pi2 and the pressure P1.

Reference sign 32 denotes a connecting line that delivers the compressed air to a forming station 4 or the valve block 90 thereof. Preferably, each of the annular channels is connected to all forming stations via corresponding connecting lines. This connecting line is preferably arranged in the rotating part of the apparatus.

Reference sign 8 schematically denotes an optional clean room, which is here preferably annular and surrounds the transport path of the plastic preforms 10. Preferably, a (geometric) axis of rotation with respect to which the transport carrier 22 is rotatable is arranged outside the clean room 8. Preferably, the clean room is sealed from the non-sterile environment by a sealing device, which preferably has at least two water locks.

Furthermore, the apparatus has a cover device (not shown in FIG. 1), which delimits the clean room 8 upwards. This cover device is preferably arranged on at least one of the stretching devices 30.

The apparatus has a plurality of measuring and/or sensor devices which serve to control the apparatus. The reference sign 14 designates a pressure-measuring device which measures an air pressure within the compressed air reservoir 2a. The other compressed air reservoirs also preferably have corresponding pressure-measuring devices.

The reference sign 16 designates a further pressure-measuring device which measures an air pressure—in particular, a container internal pressure of the plastic preform to be expanded. Preferably, such a pressure-measuring device is assigned to each forming station.

The reference sign 18 also schematically designates a flow-measuring device which determines a flow of the blowing air from a compressed air reservoir to the valve block 90 of a forming station 4. Preferably, corresponding flow-measuring devices are each arranged between a compressed air reservoir and all forming stations.

Additional, further flow-measuring devices can also be assigned between the further compressed air reservoirs and the respective forming stations.

Furthermore, position-detection devices are preferably also provided which can detect positions of the stretching rods of the individual forming stations.

The reference sign 24 designates a control device which controls and in particular regulates the apparatus 1. This control device is preferably also able to change working parameters of the apparatus.

The control device accordingly controls in particular the individual valves and hence the application of the plastic preforms of the individual pressure levels. In addition, the control device preferably also controls a movement of the stretching rods of the individual forming stations. Preferably, the control device also controls movements of the application devices, i.e., the blowing nozzles. The control device is therefore preferably suitable for controlling the points in time at which the application devices are placed on the plastic preforms and/or the points in time at which the application devices are again lifted from the plastic preforms, and in particular also for changing these points in time.

The reference sign 26 designates a memory device in which in particular measured variables are detected—in particular, pressure values and flow values, but also corresponding working parameters. Preferably, these respective values are saved with a temporal assignment.

These values can preferably be saved continuously and in particular over long periods of machine operation. The control device controls or regulates the apparatus, also taking into account these recorded measured values.

The reference sign 28 roughly designates schematically an inspection device for inspecting the manufactured containers.

The reference sign 25 designates a display device which serves to output information to a machine operator. By means of this display device, measured pressure (characteristic) curves can be output, for example.

Figure 2:
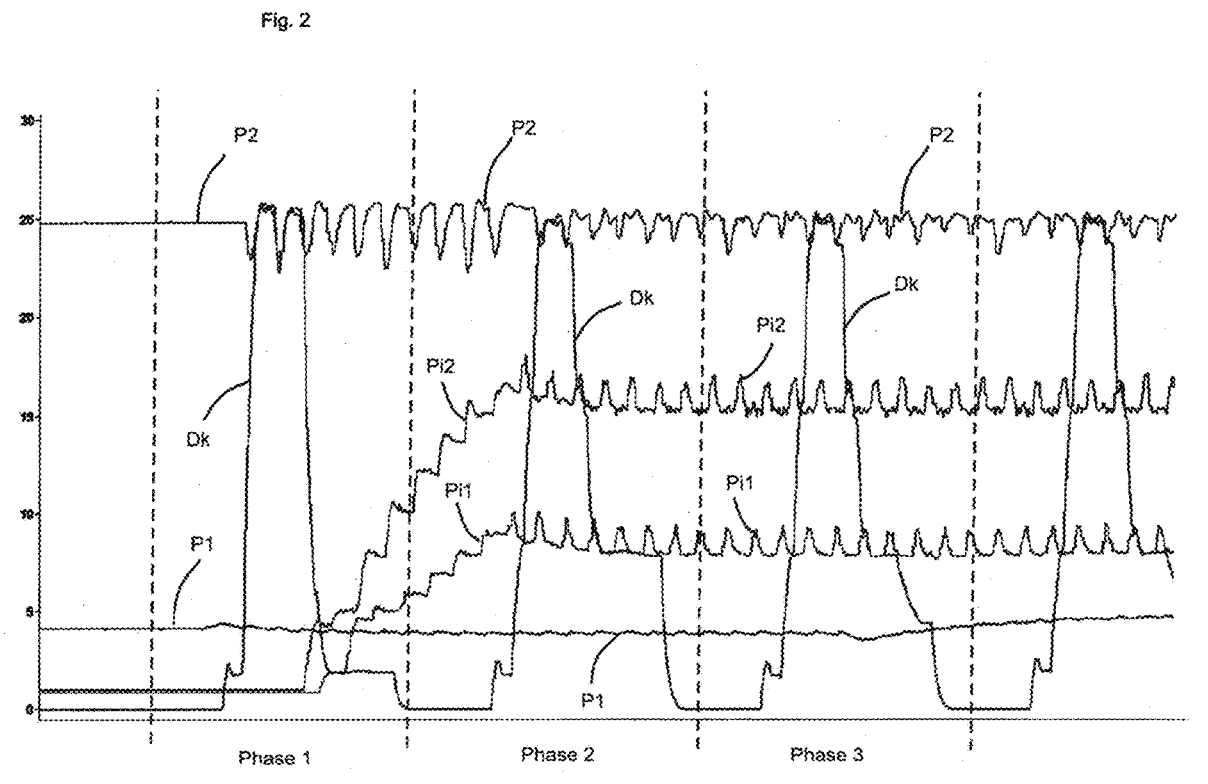

FIG. 2 shows a representation of pressure curves. The reference sign P2 designates the pressure P2 or its time curve in the individual phases 1, 2, 3. It can be seen that the P2 pressure reservoir is filled with the pressure P2 already at the start of work. During production, this pressure P2 fluctuates during the final blowing phase, because the plastic preforms are applied with pressure in each of the individual forming stations, but compressed air continues to be supplied from outside.

The reference sign P1 designates the pre-blowing pressure, which also already bears against the corresponding pressure reservoir at the beginning of production.

The two intermediate blowing pressures Pi1 and Pi2 are at the beginning of production still at the level of the external pressure. It can be seen that these two pressures build up slowly in phase 1.

In phase 2, the intermediate blowing pressures continue to build up and are then available at an essentially constant level in phase 3.

Figure 3:
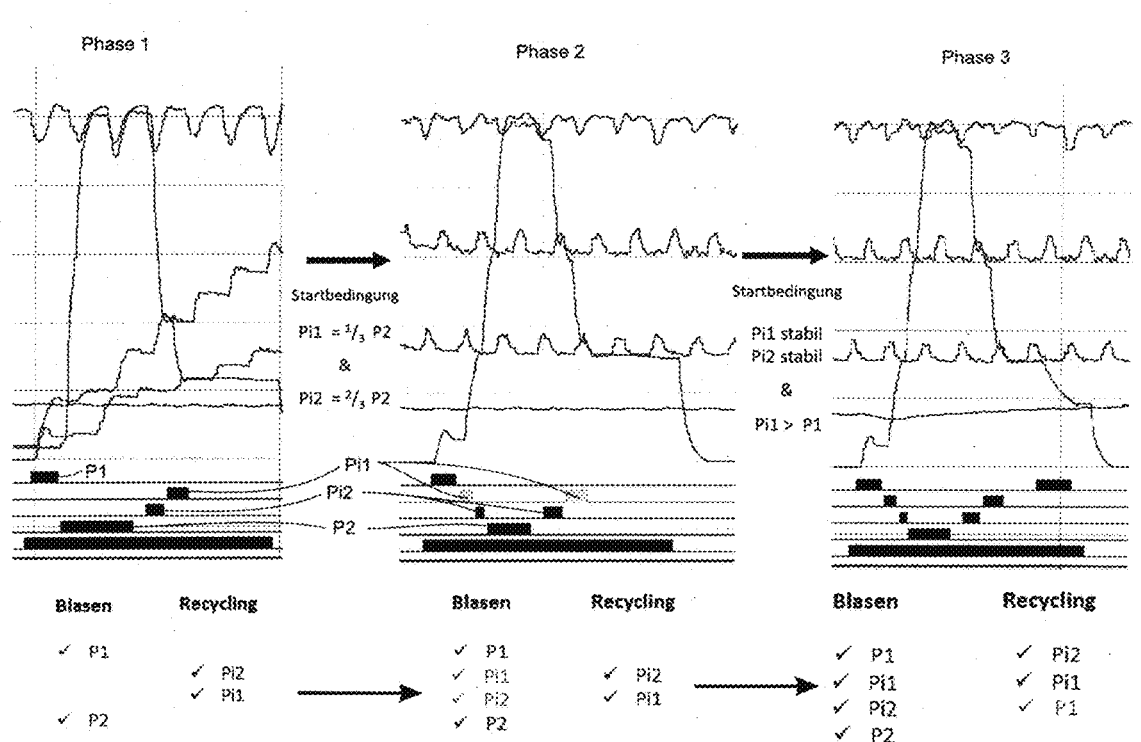
FIG. 3 shows a representation for illustrating the transition between the phases.

FIG. 3 shows the phases from FIG. 2, but here interrupted by the respective starting conditions. It can be seen that, when the starting conditions Pi1=⅓ P2 and Pi2=⅔ P2 are present, there is a transition from the first phase to the second phase.

In the first phase, the containers are applied only with the first pressure P1 and the third pressure P2; accordingly, no intermediate blowing occurs. However, during compressed air recirculation, the pressure reservoirs for the intermediate blowing pressures are also filled, and a pressure therefore slowly builds up in these pressure reservoirs.

In phase 2, the two intermediate pressure levels are also used in the blowing phase. Recycling takes place here into the intermediate blowing pressure levels Pi1 and Pi2.

When further starting conditions are reached (Pi1 stable and Pi2 stable, and Pi1 greater than P1), phase 3 is triggered. In phase 3, which is preferably the first operating mode mentioned above or the normal working mode, compressed air is also recycled into the P1 compressed air reservoir.

It is also preferable that it is reacted to different interferences. Preferably, the reaction is different depending upon the pressure reservoir.

With regard to the P2 pressure reservoir, compensation is performed via a regulating device—in particular, a dome pressure regulator.

With regard to the intermediate blowing pressures Pi1 and Pi2, a change is preferably made between the individual phases 1-3, depending upon the presence or absence of the start conditions.

With regard to the pressure reservoir P1, and in particular depending upon the condition of the pressure levels Pi1 and Pi2, this reservoir can be supplied with recycled air or fresh air. Depending upon the type of supply, it is also possible to offset the switching of the valves, and/or there can be a transition to a synchronous supply or pressure withdrawal.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A method for forming plastic preforms into plastic containers, wherein a transport device transports the plastic preforms along a predetermined transport path, wherein the transport apparatus has a rotatable transport carrier on which a plurality of forming stations for forming the plastic preforms into the plastic containers are arranged, wherein the forming stations each have application devices which apply the plastic preforms with the flowable medium, and wherein the apparatus has at least three pressure reservoirs which store the flowable medium, and, to expand them, the plastic preforms are applied in a first operating mode with a first pressure level stored in the first pressure reservoir, with at least one second pressure level stored in the second pressure reservoir, and with a third pressure level stored in the third pressure reservoir, wherein the second pressure level is higher than the first pressure level, and the third pressure level is higher than the second pressure level,
   wherein
   the apparatus is operated temporarily in a second operating mode, wherein the second operating mode differs from the first operating mode by a pressure level prevailing in the second pressure reservoir.

2. The method according to claim 1,
wherein
in at least one operating mode, compressed air is at least temporarily guided from the forming stations and/or the plastic containers back into the second pressure reservoir.

3. The method according to claim 1,
wherein
a pressure level in the second pressure reservoir is determined, and, depending upon this pressure level, there is a transition from one operating mode to the other operating mode.

4. The method according to claim 1,
wherein
the plastic preforms are applied with a further pressure level, wherein the further pressure level is higher than the second pressure level, but lower than the third pressure level.

5. The method according to claim 1,
wherein
working parameters for application with the first and/or third pressure levels are specified, and/or working parameters for application of the second pressure level are determined by a control device.

6. An apparatus for forming plastic preforms into plastic containers with a transport device configured to transport the plastic preforms along a predetermined transport path, wherein the transport device has a rotatable transport carrier on which a plurality of forming stations for forming the plastic preforms into the plastic containers are arranged, wherein the forming stations each have application devices configured to apply the plastic preforms with the flowable medium, and wherein the apparatus has at least three pressure reservoirs configured to store the flowable medium, and, to expand them, the plastic preforms are applied in a first operating mode with a first pressure level stored in the first pressure reservoir, with at least one second pressure level stored in the second pressure reservoir, and with a third pressure level stored in the third pressure reservoir, wherein the second pressure level is higher than the first pressure level, and the third pressure level is higher than the second pressure level,
   wherein
   the apparatus is configured to be operated temporarily in a second operating mode, wherein the second operating mode differs from the first operating mode by a pressure level prevailing in the second pressure reservoir, and/or the apparatus has a fresh air supply device which is configured such that it applies the first and the third pressure reservoirs, but not the second pressure reservoir, with fresh air.

7. The apparatus according to claim 6,
wherein
the apparatus has a further pressure reservoir which is configured for applying a further pressure level to the plastic preforms.

8. The apparatus according to claim 6,
wherein
compressed air from the plastic containers is guided into at least one pressure reservoir.

* * * * *